United States Patent
Akimoto

(10) Patent No.: US 10,706,339 B2
(45) Date of Patent: Jul. 7, 2020

(54) IMAGE PROCESSING APPARATUS FOR DETERMINING THE SIZE OF A READ DOCUMENT TO BE PRINTED

(71) Applicant: CANON KABUSHIKI KAISHA, Tokyo (JP)

(72) Inventor: Naoto Akimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/569,501

(22) Filed: Sep. 12, 2019

(65) Prior Publication Data

US 2020/0005103 A1 Jan. 2, 2020

Related U.S. Application Data

(63) Continuation of application No. 15/019,878, filed on Feb. 9, 2016, now Pat. No. 10,445,626.

(30) Foreign Application Priority Data

Feb. 12, 2015 (JP) ................................ 2015-025451

(51) Int. Cl.
| | | |
|---|---|---|
| G06K 15/00 | (2006.01) | |
| G06K 15/02 | (2006.01) | |
| H04N 1/00 | (2006.01) | |
| G06K 15/14 | (2006.01) | |

(52) U.S. Cl.
CPC .......... *G06K 15/1843* (2013.01); *G06K 15/14* (2013.01); *H04N 1/0032* (2013.01); *H04N 1/00708* (2013.01); *H04N 1/00779* (2013.01); *H04N 1/00795* (2013.01); *H04N 1/00912* (2013.01)

(58) Field of Classification Search
None
See application file for complete search history.

(56) References Cited

U.S. PATENT DOCUMENTS

| | | | | |
|---|---|---|---|---|
| 2010/0196041 A1* | 8/2010 | Otaki | .................. | G03G 15/5095 399/81 |
| 2012/0120418 A1* | 5/2012 | Okayama | ........... | H04N 1/00408 358/1.2 |
| 2013/0088734 A1* | 4/2013 | Kim | .................. | H04N 1/00708 358/1.13 |

* cited by examiner

*Primary Examiner* — Benjamin O Dulaney
(74) *Attorney, Agent, or Firm* — Canon U.S.A., Inc. I.P. Division

(57) ABSTRACT

An image processing apparatus which reads an image of a document and prints the read image on a sheet includes a detecting unit, an obtaining unit, and a controller. The detecting unit detects a size of the document. The obtaining unit obtains a size of the sheet. The controller performs control such that, in a case where the size of the sheet obtained by the obtaining unit is not a predetermined size, an image in a reading region based on the size of the document detected by the detecting unit is read, and in a case where the size of the sheet obtained by the obtaining unit is the predetermined size, an image in a reading region based on the size of the sheet is read.

15 Claims, 9 Drawing Sheets

102
311 ADF SENSOR SIZE DETERMINATION INFORMATION
312 ADF SIZE DETECTION AVAILABLE INFORMATION

| SENSOR SW01 | SENSOR SW02 | SENSOR SW03 | SENSOR SW04 | DETERMINED SIZE |
|---|---|---|---|---|
| OFF | OFF | OFF | OFF | A3 |
| OFF | OFF | ON | ON | A4 |
| ON | ON | OFF | OFF | LGL |
| ON | OFF | ON | ON | LTR |
| ON | ON | ON | ON | A5 |

421  422  423  424  425  311

| ACTUAL SIZE | SIZE DETECTION AVAILABILITY | ADF DETECTION SIZE |
|---|---|---|
| FOLIO | NO | LGL |
| LTR | YES | LTR |
| A4 | YES | A4 |
| GLTR | NO | LTR | though at Jovian latitudes

IMAGE PROCESSING APPARATUS FOR DETERMINING THE SIZE OF A READ DOCUMENT TO BE PRINTED

This application is a continuation of U.S. patent application Ser. No. 15/019,878, filed on Feb. 9, 2016, which claims priority from Japanese Patent Application No. 2015-025451, filed Feb. 12, 2015, all of which are hereby incorporated by reference herein in their entirety.

BACKGROUND OF THE INVENTION

Field of the Invention

The present invention relates to an image processing apparatus, a method for controlling the image processing apparatus, and a storage medium.

Description of the Related Art

There are two types of copying apparatus including a comparatively small A4 machine which supports a document reading unit for an A4 size and an LTR size and supports sheets of the A4 size and the LTR size and a large A3 machine which supports a document reading unit for a size equal to or smaller than an A3 size including the A4 size and supports sheets equal to or smaller than the A3 size for recording. The A3 machine supports documents in a range from an A5 size to an A3 size and has a reading unit including an automatic document feeder (ADF) having a plurality of document size sensors which detect a document size. When a document is placed on the ADF, states of the document size sensors are changed, and the copying apparatus automatically determines a document size in accordance with the states of the document size sensors and uses the document size in a copy process (refer to Japanese Patent Laid-Open No. 9-297434).

In recent years, there is a demand for printing on sheets of special document sizes only used in specific regions or the like in addition to printing on sheets of document sizes of an A type, a B type, an LTR/LGL type which are generally used.

However, the document size sensors only have accuracy for identifying the representative document sizes, such as the A type, the B type, and the LTR/LGL type. For example, FOLIO, which is an example of a sheet of a special document size, has a document size of 210 mm×330 mm. However, since the document size sensors only have accuracy for identifying the representative document sizes, states of the document size sensors obtained when FOLIO is placed on the ADF correspond to states of the document size sensors obtained when LGL (216 mm×356 mm), which is a representative sheet, is placed on the ADF. In this case, the copying apparatus determines that the document size of the document placed on the ADF corresponds to LGL which is the representative document size in accordance with the states of the document size sensors. In this way, if a document of a special document size which is only used in a specific region or the like is placed on the ADF, the ADF may not appropriately recognize the document size. As a result, the copying apparatus may wrongly determine the document size as another representative document size before determining a reading reference position and a reading length for performing a copy operation. Consequently, a reading range is shifted in printing as a result of the copy.

SUMMARY OF THE INVENTION

According to an aspect of the present invention, an image processing apparatus which reads an image of a document and prints the read image on a sheet includes a detecting unit configured to detect a size of the document, an obtaining unit configured to obtain a size of the sheet, and a controller configured to perform control such that, in a case where the size of the sheet obtained by the obtaining unit is not a predetermined size, an image in a reading region based on the size of the document detected by the detecting unit is read, and in a case where the size of the sheet obtained by the obtaining unit is the predetermined size, an image in a reading region based on the size of the sheet is read.

Even in a case where a document and a sheet of sizes which are not appropriately recognized by document size sensors are set, printing may be performed in an appropriate reading range corresponding to the document size. A method for controlling an image processing apparatus which reads an image of a document and prints the read image on a sheet includes detecting a size of the document, obtaining a size of the sheet, and performing control such that, in a case where the size obtained in the obtaining is not a predetermined size, an image in a reading region based on the size of the document detected in the detecting is read, and in a case where the size obtained in the obtaining is the predetermined size, an image in a reading region based on the size of the sheet is read. Further features of the present invention will become apparent from the following description of exemplary embodiments with reference to the attached drawings.

DESCRIPTION OF THE EMBODIMENT

An embodiment of the present invention will be described hereinafter with reference to the accompanying drawings.

Figure 1:
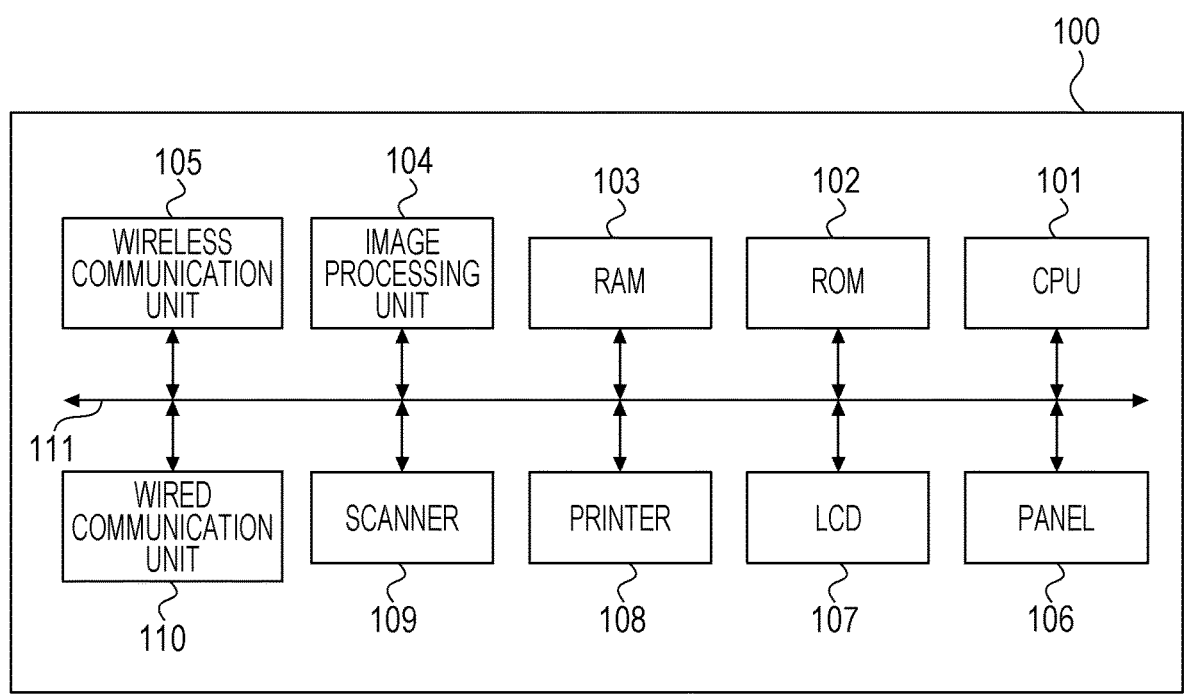
FIG. 1 is a diagram illustrating a hardware configuration of a copying apparatus.

FIG. 1 is a diagram illustrating a hardware configuration of a copying apparatus 100.

The copying apparatus 100 includes, as a hardware configuration, a CPU 101, a ROM 102, a RAM 103, an image processing unit 104, a wireless communication unit 105, an operation panel 106, and a display unit (LCD) 107. The copying apparatus 100 further includes, as the hardware configuration, a printer 108, a scanner 109, and a wired communication unit 110.

The CPU 101 integrally controls the devices connected to a system bus 111 and in addition executes programs stored in the ROM 102. Functions of the copying apparatus 100 and processes in flowcharts below are realized when the CPU 101 executes processes in accordance with the programs.

The RAM 103 functions as a main memory and a work area of the CPU 101, and furthermore, is used as a memory which may be backed up and which stores the setting information of the apparatus. Sheet-size setting information and sheet-type setting information for trays which are used in the embodiment below and various setting information for services are stored in the RAM 103.

The image processing unit 104 performs image processes including a process of decoding printing data externally received so as to convert the printing data into raw data and a process of compressing an image read by the scanner 109 so as to obtain JPEG data under control of the CPU 101.

The wireless communication unit 105 has a wireless LAN communication function and enables wireless LAN communication with a terminal on a network through a wireless LAN router connected to a public network or a local network.

The panel 106 is an operation unit which accepts an instruction issued by a user, and includes a power key, a numeric keypad, a start key, a stop key, a set key, a selection key, various setting keys, and an LED.

The LCD 107 which is a display unit formed on the panel 106 displays, under control of the CPU 101, a message for the user and a plurality of options of settings and operations in an apparatus setting window and an operation determination window so as to enable the user to perform selection.

The printer 108 performs image forming on a sheet by an electrophotographic method. The scanner 109 reads an image printed on a sheet. An automatic document feeder (ADF) is disposed on the scanner 109, and therefore, the scanner 109 is capable of automatically reading a plurality of sheets of documents. The ADF includes a hard switch used to determine a size of a set document. The CPU 101 determines a size of a set document in accordance with a state of the hard switch. The ADF is an example of an automatic sheet feeding apparatus.

The wired communication unit 110 controls a wired LAN so as to enable transmission of data to and reception of data from a terminal on the public network or the local network.

Figure 2:
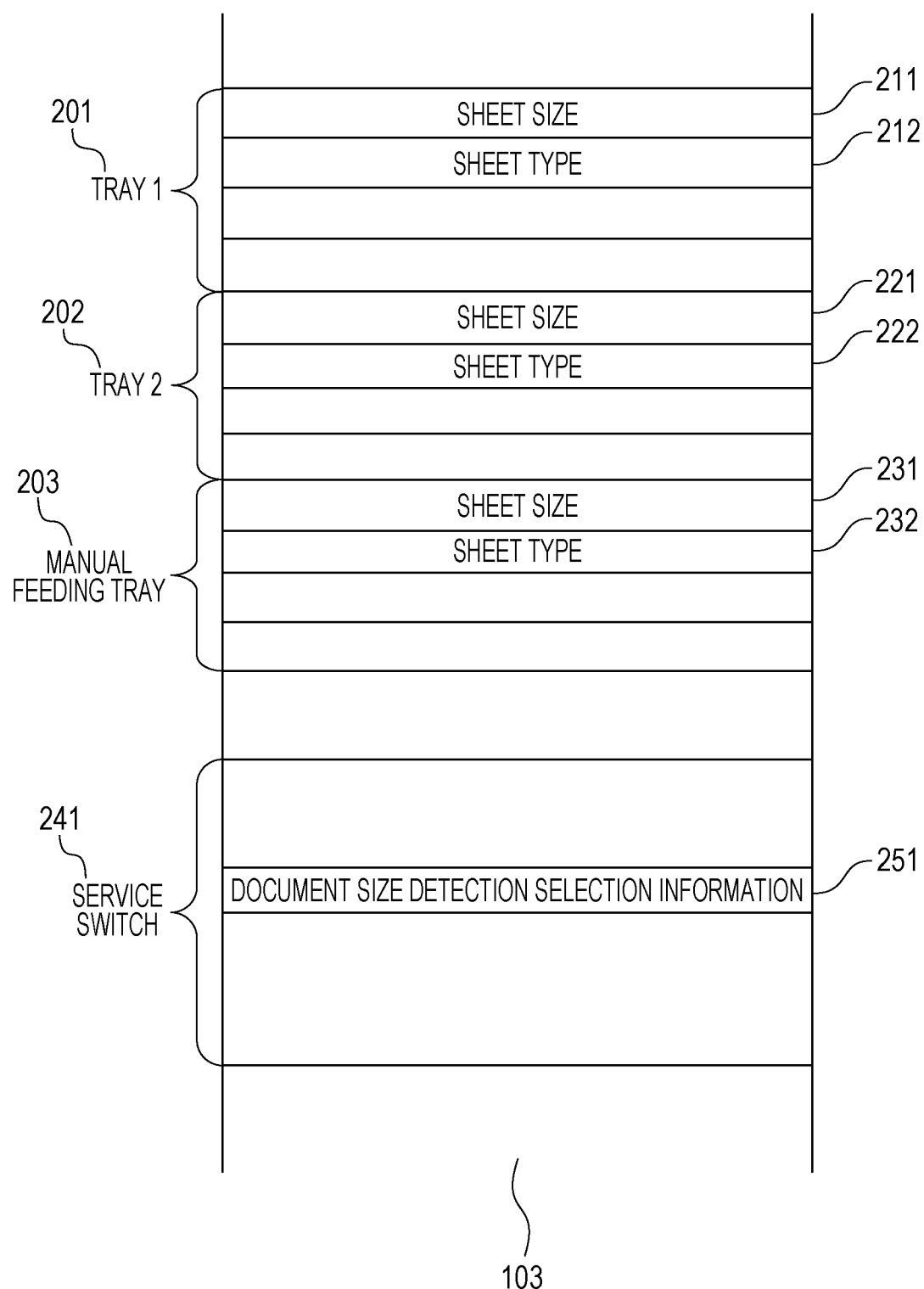
FIG. 2 is a diagram illustrating a configuration of a RAM.

FIG. 2 is a diagram illustrating a configuration of the RAM 103. It is assumed here that the copying apparatus 100 of this embodiment has three sheet feeding trays including a first tray, a second tray, and a manual feeding tray. However, the embodiment is not limited to these. The RAM 103 includes regions for storing setting information of the copying apparatus 100 including a region for storing information on the first tray 201, a region for storing information on the second tray 202, and a region for storing the manual feeding tray 203. For example, as information for each tray, the information on the first tray 201 includes a sheet size 211, a sheet type 212, and other information. The sheet size 211 stores a sheet size of the first tray. The sheet type 212 stores a sheet type of the first tray. The CPU 101 specifies information on the sheet size 211 and information on the sheet type 212 in accordance with a specifying operation performed by a user through the panel 106. Similarly, information on the second tray 202 includes a sheet size 221, a sheet type 222, and other information. Furthermore, information on the manual feeding tray 203 includes a sheet size 231, a sheet type 232, and other information. The trays are examples of sheet feeding stages.

Furthermore, the RAM 103 includes a service switch 241 which is not open to the user in the copying apparatus 100. The CPU 101 is capable of operating the service switch 241 in accordance with a certain operation performed by a service engineer so as to perform switching among special operations which are not open to the user. The service switch 241 includes document size detection selection information 251 which is referred to by the CPU 101 in the embodiment below. The document size detection selection information 251 is setting information specifying a document size detection method and has a value of "ADF document size basis" or "sheet size basis". "ADF document size basis" is setting information for performing copy, after a document size is determined while it is determined that a size determined by document size sensors is valid and a reading reference position and a reading length are determined. The copying apparatus 100 including the scanner 109 having the ADF including the document size sensors operates using "ADF document size basis" as default setting information. "Sheet size basis" is setting information for performing copy after a reading reference position and a reading length are determined taking a magnification of enlargement and reduction into consideration in accordance with a sheet size of an output destination of printing as a base. In a case where "sheet size basis" is set, the copying apparatus 100 determines a document reading range irrespective of output values of the document size sensors even if the copying apparatus 100 includes the document size sensors.

Figures 3, 4:
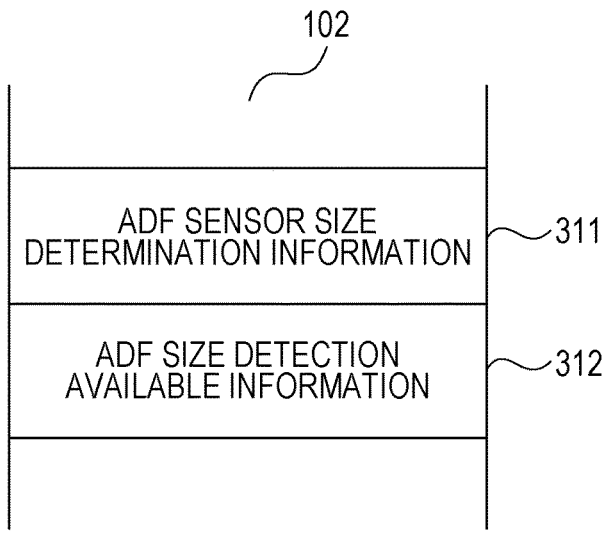
FIG. 3 is a diagram illustrating a configuration of a ROM.
FIG. 4 is a diagram illustrating ADF sensor size determination information.
Figures 5, 6:
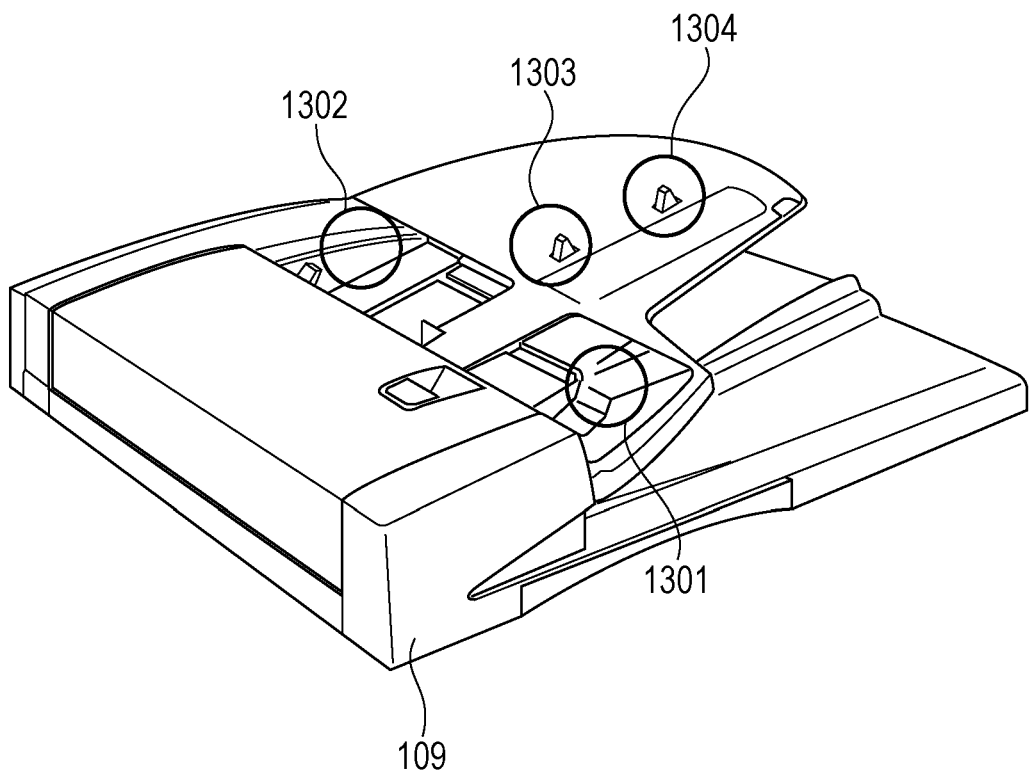
FIG. 5 is a diagram illustrating arrangement of sensors.
FIG. 6 is a diagram illustrating ADF size detection available information.

FIG. 3 is a diagram illustrating a configuration of the ROM 102. The ROM 102 stores ADF sensor size determination information 311 and ADF size detection available information 312. The ADF sensor size determination information 311 is information constituted by a table including output values of the document size sensors and sizes determined by the output values. A configuration of the ADF sensor size determination information 311 is illustrated in FIG. 4. The ADF sensor size determination information 311 includes columns of a sensor SW01 421, a sensor SW02 422, a sensor SW03 423, a sensor SW04 424, and a determined size 425. The sensors SW correspond to output values of the document size sensors and represent an on state or an off state. In this embodiment, a case where four document size sensors are disposed on the ADF of the scanner 109 will be described as an example. FIG. 5 is a diagram illustrating arrangement of the sensors. The sensor SW01 disposed in a position 1301 is a first sensor which determines a size of a document in a main scanning direction. The sensor SW02 disposed in a position 1302 is a second sensor which determines a size of a document in the main scanning direction. The sensor SW03 disposed in a position 1303 is a first sensor which determines a size of a document in a sub scanning direction. The sensor SW04 disposed in a position 1304 is a second sensor which determines a size of a document in the sub scanning direction. The CPU 101 obtains the determined size 425 in accordance with states of the four sensors. For example, in a case where the sensor SW01 is in an off state, the sensor SW02 is in an off state, the sensor SW03 is in an off state, and the sensor SW04 is in an off state, the CPU 101 determines an A3 size as described in the determined size 425. The ADF sensor size determination information 311 may be table information automatically generated by the CPU 101 or table information set in the ROM 102 or the like in advance.

The ADF size detection available information 312 is table information which represents whether a sheet size is recognized from output values of the document size sensors and which is set for each size. A configuration of the ADF size detection available information 312 is illustrated in FIG. 6. The ADF size detection available information 312 includes columns of an actual size 531, size detection availability 532, and an ADF detection size 533. The columns of the actual size 531 store sizes. Each of the columns of the size detection availability 532 stores information indicating whether a size in the actual size 531 may be detected and determined using output values of the document size sensors. When "YES" is included in a column of the size detection availability 532, the detection is available. When "NO" is included in a column of the size detection availability 532, the detection is not available. The ADF detection size 533 corresponding to "YES" of the size detection availability 532 indicates one of the sizes included in the columns of the determined size 425 in the ADF sensor size determination information 311. Each of the columns of the ADF detection size 533 stores information on a size determined by output values of the document size sensors in a case where a sheet of a size stored as the actual size 531 is placed on the ADF. For example, in a case where "FOLIO" is stored as the actual size 531, the size detection availability 532 indicates "NO" since "FOLIO" is not included in the sizes determined by the ADF sensor size determination information 311. Since the sensor SW01 is in an on state, the sensor SW02 is in an on state, the sensor SW03 is in an off state, and the sensor SW04 is in an off state as outputs of the sensors when a sheet of "FOLIO" is placed on the ADF, "LGL" is set as the determined size 425, and therefore, "LGL" is set as the ADF detection size 533. The ADF size detection available information 312 may be table information automatically generated by the CPU 101 in accordance with accuracy of the sensors or the like or table information set by the ROM 102 or the like in advance, for example.

Figure 7:
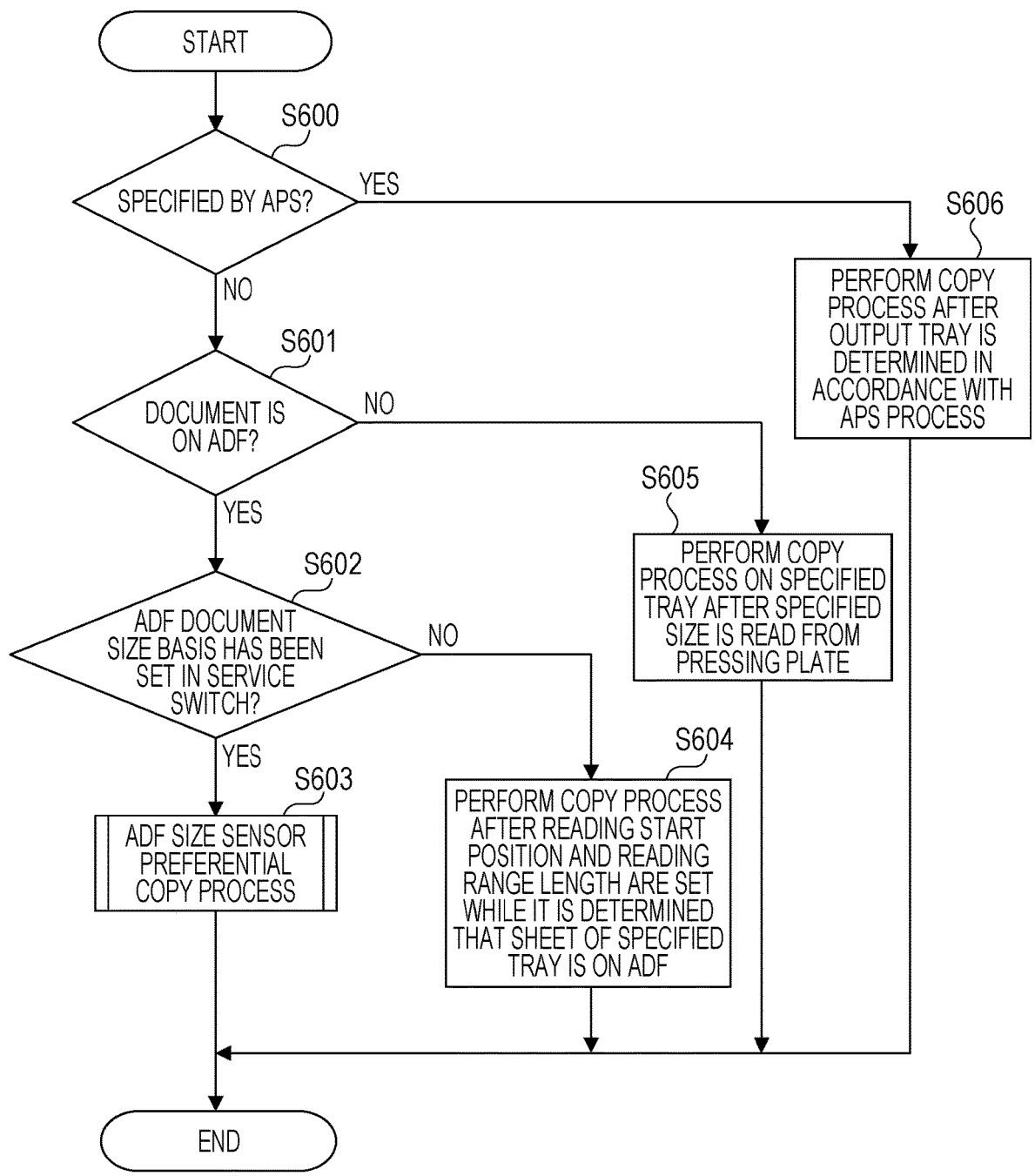
FIG. 7 is a flowchart illustrating a copy process.

FIG. 7 is a flowchart illustrating a copy process of this embodiment.

In step S600, the CPU 101 determines whether a copy type has been specified by automatic paper selection (APS). When determining that a copy type has been specified by the APS (Yes in step S600), the CPU 101 proceeds to step S606, and otherwise (No in step S600), the CPU 101 proceeds to step S601.

In step S606, the CPU 101 performs a copy process after determining an output destination tray in accordance with an APS process.

In step S601, the CPU 101 determines whether a document is placed on the ADF of the scanner 109. When determining that a document is placed on the ADF of the scanner 109 (Yes in step S601), the CPU 101 proceeds to step S602 so that a copy operation of reading the document from the ADF is to be performed. On the other hand, when determining that a document is not placed on the ADF of the scanner 109 (No in step S601), the CPU 101 proceeds to step S605 so as to perform reading using a pressing plate.

In step S605, the CPU 101 reads a document on the pressing plate by a size specified by the user and performs a copy process of performing printing on a sheet on a specified tray after image processing. Since most pressing plates do not have document size sensors, the user inputs a document size. In a case where the pressing plate has document size sensors, the operation of specifying a document size performed by the user may be omitted and the CPU 101 may perform a document size sensor priority copy operation in accordance with states of the document size sensors of the pressing plate.

In step S602, the CPU 101 determines whether the document size detection selection information 251 of the service switch 241 in the RAM 103 indicates "ADF document size basis". When "ADF document size basis" is not detected (No in step S602), the CPU 101 proceeds to step S604. On the other hand, when "ADF document size basis" is detected (Yes in step S602), the CPU 101 proceeds to step S603.

In step S604, the CPU 101 performs an operation corresponding to "sheet size basis". More specifically, the CPU 101 performs a copy process of determining that a sheet of a size corresponding to a specified tray is placed on the ADF irrespective of output results of the document size sensors, performing reading after a reading start position and a reading range length are set, and performing printing after image processing.

In step S603, the CPU 101 performs an ADF size sensor preferential copy process such that output results of the document size sensors are preferentially considered. The process in step S603 will be described in detail with reference to FIG. 8. When the ADF size sensor preferential copy process is terminated, the CPU 101 terminates the process of the flowchart illustrated in FIG. 7.

Figure 8:
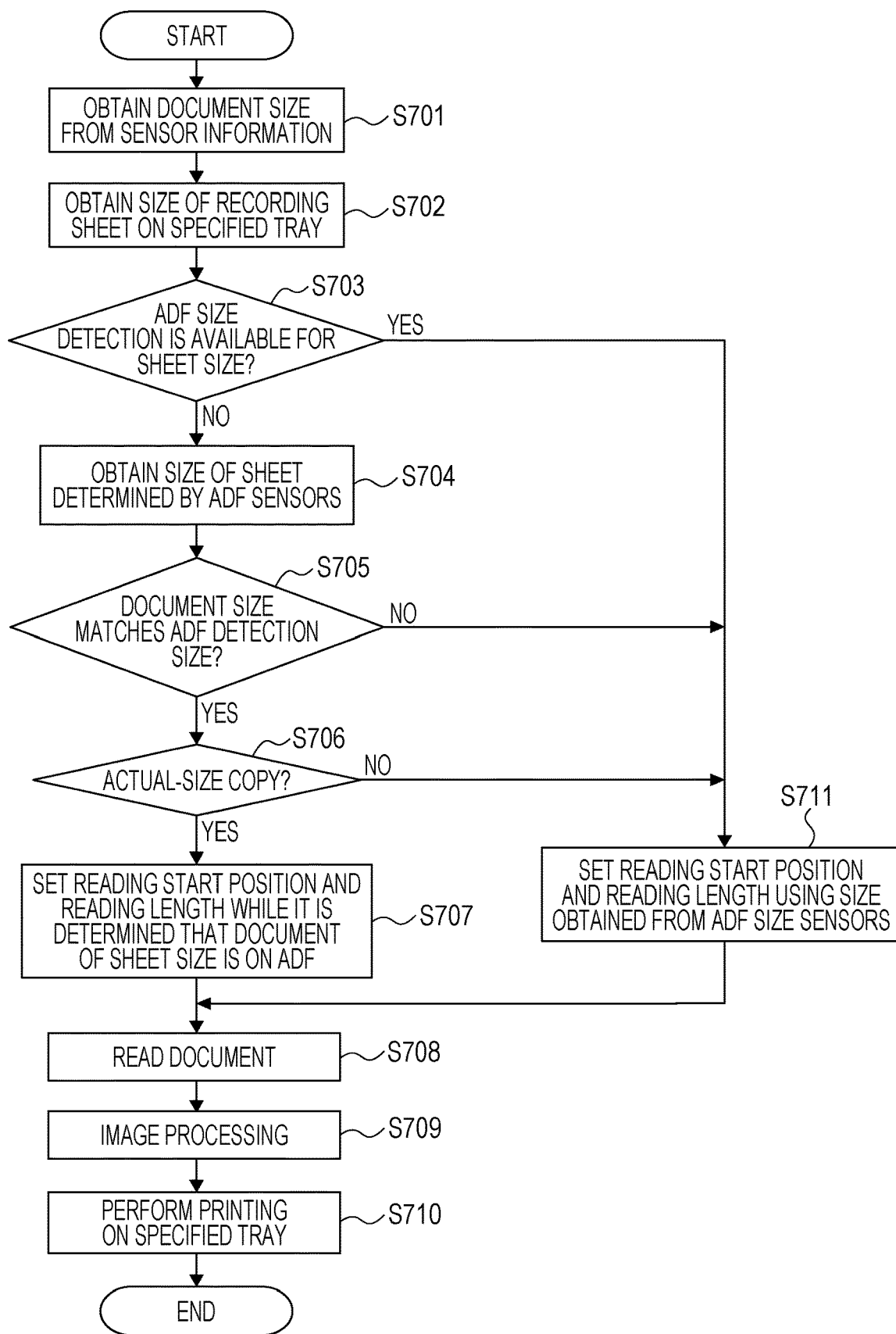
FIG. 8 is a flowchart illustrating an ADF size sensor preferential copy process in detail.

FIG. 8 is a flowchart illustrating the ADF size sensor preferential copy process performed in step S603 in detail.

In step S701, the CPU 101 obtains a size of a document placed on the ADF in accordance with states of the document size sensors. More specifically, the CPU 101 compares the states of the four document size sensors with states of the sensor SW01 421 to the sensor SW04 424 of the ADF sensor size determination information 311 in the ROM 102 so as to detect a row of states which match the states of the four document size sensors. Thereafter, the CPU 101 obtains information on the determined size 425 corresponding to the row at this time as a document size.

In step S702, the CPU 101 obtains information on a size of a sheet set in a tray specified as a copy output destination. If the output destination tray is the first tray 201, the CPU 101 obtains a size stored in the sheet size 211 of the RAM 103. In step S703, the CPU 101 determines whether "YES" (that is, detection available) is stored in the size detection availability 532 of the ADF size detection available information 312 for the sheet size of the tray obtained in step S702. When "YES" is not detected (No in step S703), the CPU 101 proceeds to step S704 whereas when "YES" is detected (Yes in step S703), the CPU 101 proceeds to step S711.

In step S704, the CPU 101 obtains information on the ADF detection size 533 of the ADF size detection available information 312 for the sheet size of the tray obtained in step S702. Specifically, the CPU 101 checks a size determined in accordance with output values of the document size sensors when a sheet of the sheet size of the tray obtained in step S702 is placed on the ADF.

In step S705, the CPU 101 determines whether the document size obtained in step S701 matches the size which is determined using the document size sensors when a sheet of the sheet size of the tray is placed on the ADF and which is obtained in step S704. When the matching is detected (Yes in step S705), the CPU 101 proceeds to step S706 whereas when the matching is not detected (No in step S705), the CPU 101 proceeds to step S711.

In step S706, the CPU 101 determines whether an actual size (100%) has been set as a copy magnification since it is highly likely that a document of a size corresponding to a sheet size of an output tray which is not appropriately detected by the ADF has been set on the ADF. When the actual size has been set as the copy magnification through the panel 106 (Yes in step S706), for example, the CPU 101 proceeds to step S707 whereas when the actual size has not been set as the copy magnification (No in step S706), the CPU 101 proceeds to step S711. The operation in step S706 is an example of a copy magnification determination process.

In step S707, the CPU 101 determines that a document of the size corresponding to the sheet size of the output tray which is not appropriately detected by the ADF has been set on the ADF. Thereafter, even in the ADF size sensor preferential copy process, the CPU 101 determines that a document of the size corresponding to the sheet size of the tray obtained in step S702 has been placed on the ADF and sets a reading start position and a reading range length.

Subsequently, in step S708, the CPU 101 executes control such that the document is read using the set reading start portion and the set reading range length.

In step S709, the CPU 101 operates the image processing unit 104 so as to perform image processing required for the copy.

In step S710, the CPU 101 prints an output result of the image processing unit 104 on the sheet of the specified tray in the printer 108 and terminates the copy process.

On the other hand, in step S703, when "YES" (detection available) is stored in the size detection availability 532 of the ADF size detection available information 312 for the sheet size of the tray obtained in step S702, the CPU 101 determines that size detection is to be appropriately performed by the document size sensors. Therefore, in step S711, the CPU 101 sets a reading start position and a reading range length in accordance with the size obtained using the document size sensors (the determined size 425 of the ADF sensor size determination information 311 in the ROM 102).

Furthermore, in step S705, when the document size obtained in step S701 does not match the size determined using the document size sensors obtained when a sheet of the size of the tray obtained in step S704 is placed on the ADF, it is determined that the sheet size of the tray is different from the document size of the ADF. In a case where the sheet size of the tray obtained in step S704 is FOLIO, for example, when FOLIO is placed on the ADF, LGL is read from the document size sensors. Here, in a case where the sheet size obtained in step S704 is different from the document size obtained in step S701 (the sheet size is A4, for example), the CPU 101 determines that a size of a document is obviously not FOLIO. Therefore, in step S711, the CPU 101 prioritizes information on the document size sensors and sets a reading start position and a reading range length in accordance with the size obtained using the document size sensors (the determined size 425 of the ADF sensor size determination information 311 in the ROM 102).

When the actual size (100%) is not set as the copy magnification in step S706, enlargement or reduction is performed, and therefore, it is highly likely that the sheet size of the tray and the document size are different from each other. Therefore, in step S711, the CPU 101 validates the determination of the document size sensors and sets a reading start position and a reading range length in accordance with the size obtained using the document size sensors (the determined size 425 of the ADF sensor size determination information 311 in the ROM 102).

Figure 9:
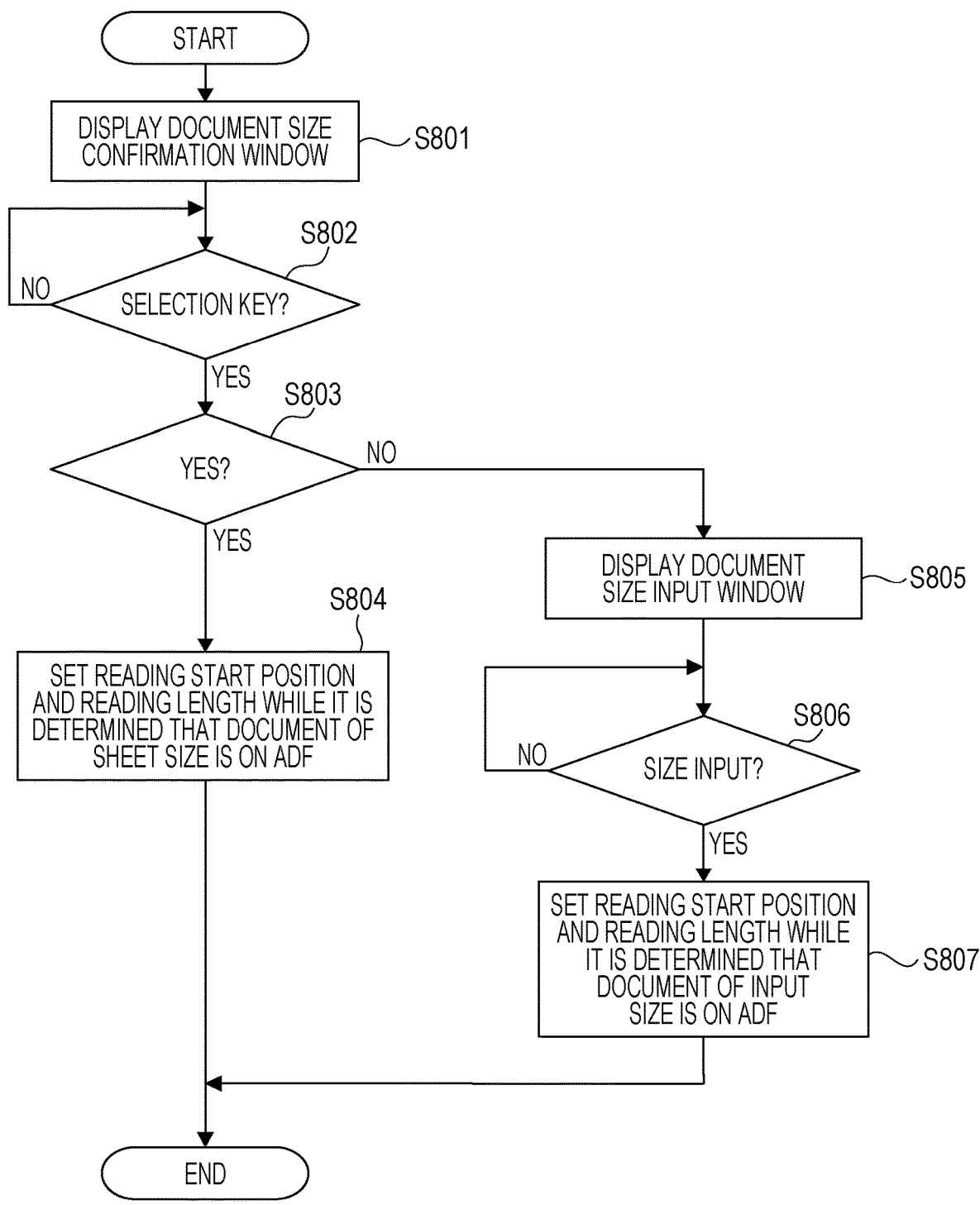
FIG. 9 is a flowchart illustrating an information process which is different from an information process executed in step S707.

FIG. 9 is a flowchart illustrating an information process which is different from the information process executed in step S707. In step S707, the CPU 101 determines that a document of a size corresponding to the sheet size of the tray obtained in step S702 has been placed on the ADF and sets a reading start position and a reading range length. However, in this flowchart, the CPU 101 prompts the user to check a size of the document again before processing, and if a different size is detected, the size is input again.

Figure 10:
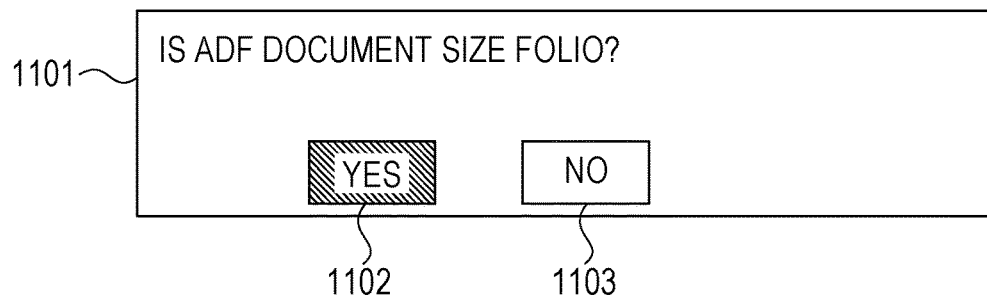
FIG. 10 is a diagram illustrating a document size confirmation window.

In step S801, the CPU 101 displays a window for checking whether a document size is the same as the sheet size of the tray obtained in step S702 in the LCD 107. The displayed window is illustrated in FIG. 10. FIG. 10 is a diagram illustrating a document size confirmation window. The CPU 101 provides the window for selecting YES 1102 or NO 1103 for the user by operating the panel 106.

In step S802, the CPU 101 determines whether selection key input has been performed by operating the panel 106. When the selection key input has not been performed (No in step S802), the CPU 101 waits for the selection key input in step S802. When the selection key input has been performed (Yes in step S802), the CPU 101 proceeds to step S803.

In step S803, the CPU 101 determines whether "YES" has been selected. When "YES" has been selected (Yes in step S803), the CPU 101 proceeds to step S804.

In step S804, the CPU 101 determines that a document of a size corresponding to the sheet size of the tray obtained in step S702 has been placed on the ADF and sets a reading start position and a reading range length.

When "YES" has not been selected in step S803 (No in step S803), the document size is different from the sheet size of the tray obtained in step S702, and therefore, the CPU 101 proceeds to step S805.

Figure 11:
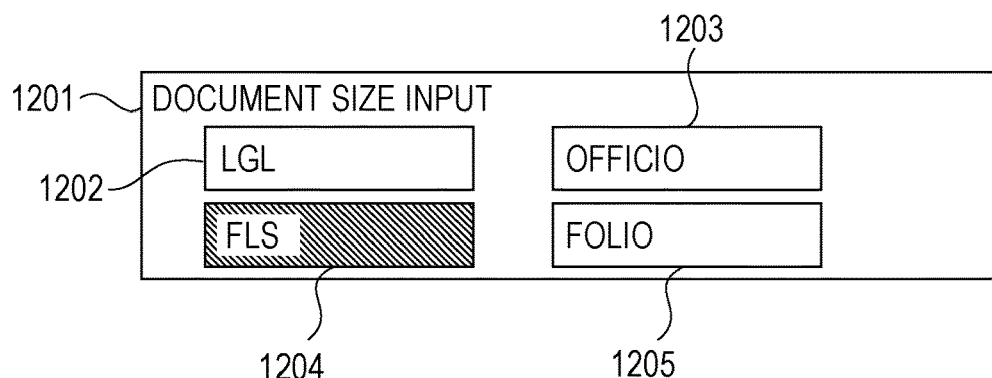
FIG. 11 is a diagram illustrating a document size input window.

In step S805, the CPU 101 displays a window for inputting the document size in the LCD 107. The displayed window is illustrated in FIG. 11. FIG. 11 is a diagram illustrating a document size input window. The CPU 101 provides the window for selecting one of "LGL" 1202, "OFFICIO" 1203, "FLS" 1204, and "FOLIO" 1205 for the user operating the panel 106. The sizes displayed by the CPU 101 in the window are ADF detection sizes determined in accordance with current output values of the document size sensors (the determined size 425 of the ADF sensor size determination information 311) which match the ADF detection sizes 533 of the ADF size detection available information 312. The CPU 101 may perform control such that all sheet sizes supported by the copying apparatus 100 are displayed.

Subsequently, in step S806, the CPU 101 determines whether a selection key has been pressed on operating the panel 106 so that size input is performed. When the size input has not been performed (No in step S806), the CPU 101 further waits for size input in step S806. When the size input has been performed (Yes in step S806), the CPU 101 proceeds to step S807.

In step S807, the CPU 101 determines that a document of the input size has been placed on the ADF and sets a reading start position and a reading range length.

Figure 12:
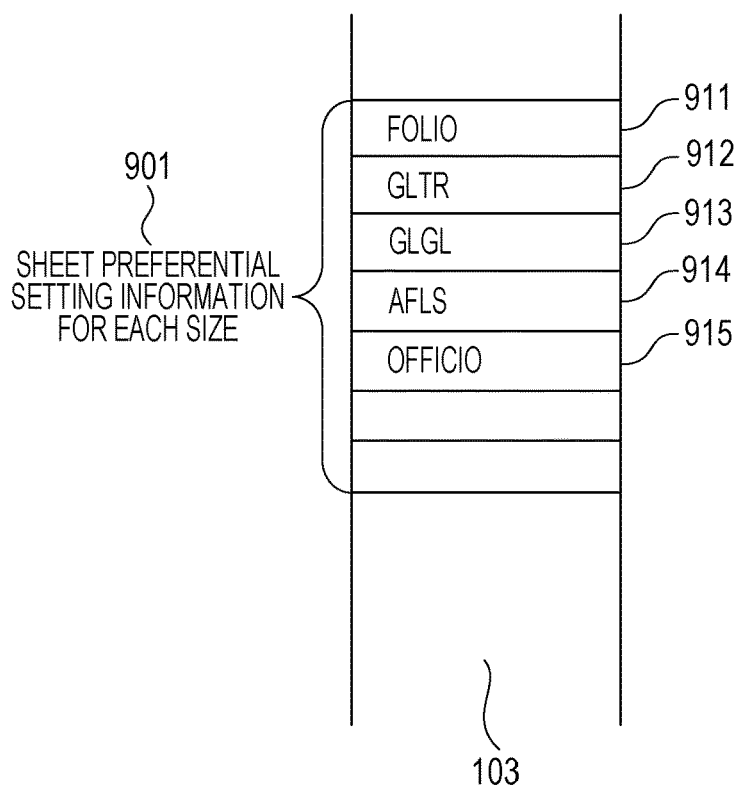
FIG. 12 is a diagram illustrating a configuration of the RAM.

FIG. 12 is a diagram illustrating a configuration of the RAM 103. Although the RAM 103 illustrated in FIG. 12 is the same as that illustrated in FIG. 2, the RAM 103 of FIG. 12 includes sheet preferential setting information 901 for each size. The sheet preferential setting information 901 for each size has regions which store setting information of sizes corresponding to "NO" of the size detection availability 532 in the ADF size detection available information 312, that is, regions for FOLIO 911, GLTR 912, GLGL 913, and so on. The setting information represents "YES" or "NO". When "YES" is set, the CPU 101 determines that a document of a certain size is placed on the ADF for copy performed on a sheet of the certain size using the ADF, and copy is performed after a reading start position and a reading range length are set. When "NO" is set, the CPU 101 performs copy after setting a reading start position and a reading range length using a size obtained by the document size sensors. In accordance with a setting operation or the like performed by the user through the panel 106, the CPU 101 sets setting information indicating whether a sheet is to be determined as a sheet preferential target, that is, whether the setting information is "YES" or "NO" for each sheet size in the sheet preferential setting information 901. Consequently, the CPU 101 may perform a copy operation, only for a specific size, after determining that a document of a size corresponding to a sheet size of a tray of this embodiment has been placed on the ADF and setting a reading start position and a reading range length.

Figure 13:
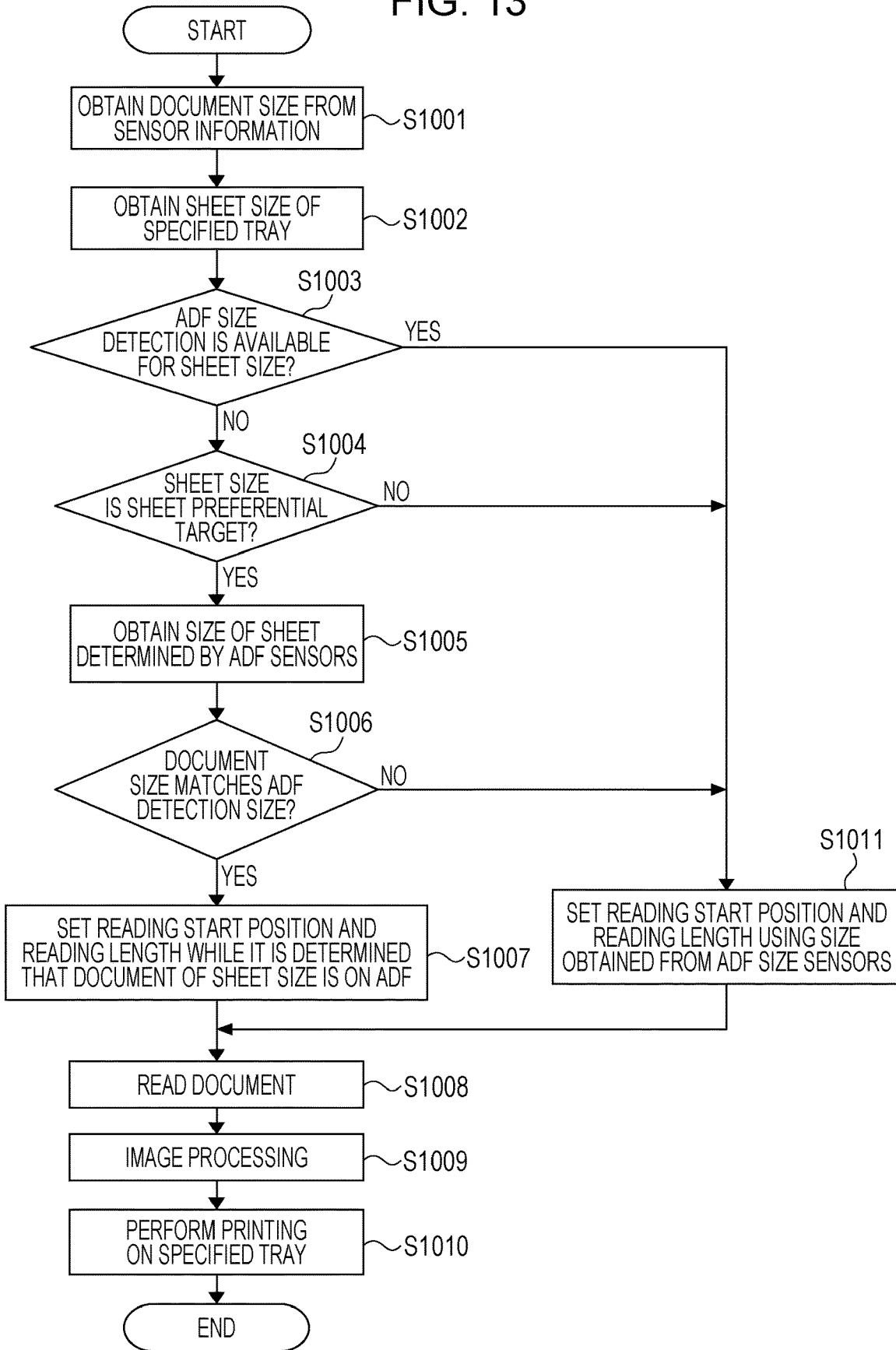
FIG. 13 is a flowchart illustrating an ADF size sensor preferential copy process based on setting information in detail.

FIG. 13 is a flowchart illustrating the ADF size sensor preferential copy process performed in step S603 based on the setting information illustrated in FIG. 12.

In step S1001, the CPU 101 obtains a size of a document placed on the ADF in accordance with states of the document size sensors. More specifically, the CPU 101 compares states of the four document size sensors with states of the sensor SW01 421 to the sensor SW04 424 of the ADF sensor size determination information 311 in the ROM 102 so as to detect a row of states which match the states of the four document size sensors. Thereafter, the CPU 101 obtains information on the determined size 425 corresponding to the row at this time.

In step S1002, the CPU 101 obtains information on a size of a sheet set in a tray specified as a copy output destination. If the output destination tray is the first tray 201, the CPU 101 obtains a size stored in the sheet size 211 in the RAM 103.

In step S1003, the CPU 101 determines whether "YES" (that is, detection available) is stored in the size detection availability 532 of the ADF size detection available information 312 for the sheet size of the tray obtained in step S1002. When "YES" is not detected, the CPU 101 proceeds to step S1004 whereas when "YES" is detected, the CPU 101 proceeds to step S1011.

In step S1004, the CPU 101 determines whether the sheet size of the tray obtained in step S1002 has been set as a sheet preferential target, that is, whether the sheet preferential setting information 901 of the sheet size represents "YES". For example, in a case where the tray sheet size obtained in step S1002 is FOLIO, for example, the CPU 101 determines whether setting information of FOLIO 911 in the sheet preferential setting information 901 represents "YES". The operation in step S1004 is an example of a priority setting determination process.

When the sheet preferential setting information 901 of the sheet size of the tray represents "YES" in step S1004, the CPU 101 proceeds to step S1005, and otherwise, the CPU 101 proceeds to step S1011.

In step S1005, the CPU 101 obtains information on the ADF detection size 533 of the ADF size detection available information 312 of the sheet size of the tray. Specifically, the CPU 101 checks a size determined in accordance with output values of the document size sensors obtained in a case where a sheet of the sheet size of the tray obtained in step S1002 is placed on the ADF.

In step S1006, the CPU 101 determines whether the document size obtained in step S1001 matches the size determined in accordance with the output values of the document size sensors obtained in step S1005 in a case where a sheet of the sheet size of the tray is placed on the ADF. When the matching is detected, the CPU 101 proceeds to step S1007 whereas when the matching is not detected, the CPU 101 proceeds to step S1011.

In step S1007, even in the ADF size sensor preferential copy process, the CPU 101 determines that a document of the size corresponding to the sheet size of the tray obtained in step S1002 has been placed on the ADF and sets a reading start position and a reading range length.

Subsequently, in step S1008, the CPU 101 executes control such that the document is read in accordance with the set reading start portion and the set reading range length.

In step S1009, the CPU 101 causes the image processing unit 104 to perform image processing required for copy.

In step S1010, the CPU 101 prints an output result of the image processing unit 104 on the sheet of the specified tray in the printer 108 and terminates the copy process.

In step S1003, when "YES" (detection available) is stored in the size detection availability 532 of the ADF size detection available information 312 of the sheet size of the tray obtained in step S1002, the CPU 101 determines that size detection is appropriately performed by the document size sensors. Therefore, in step S1011, the CPU 101 sets a reading start position and a reading range length in accordance with the size obtained by the document size sensors (the determined size 425 of the ADF sensor size determination information 311 in the ROM 102).

Furthermore, in step S1004, when the sheet preferential setting information 901 of the sheet size of the tray does not represent "YES", the operation to be performed in a case where a document of the same size as the sheet has been placed on is not required. Therefore, in step S1011, the CPU 101 sets a reading start position and a reading range length in accordance with the size obtained by the document size sensors (the determined size 425 of the ADF sensor size determination information 311 in the ROM 102).

Furthermore, in step S1006, when the document size obtained in step S1001 does not match the size which is determined using the document size sensors in a case where a sheet of the size of the tray is placed on the ADF and which is obtained in step S1005, it is determined that the sheet size of the tray is different from the document size of the ADF. Therefore, in step S1011, the CPU 101 sets a reading start position and a reading range length in accordance with the size obtained by the document size sensors (the determined size 425 of the ADF sensor size determination information 311 in the ROM 102).

According to the procedure described above, in copy performed on a sheet of a size which may not be determined by the document size sensors, it is determined that a document of the same size as the sheet has been placed on the ADF before a reading start position and a reading range length are determined. As a result, even when a document and a sheet which are not appropriately recognized by the document size sensors are set, a reading range is not shifted and copy is appropriately performed.

As described above, according to the foregoing embodiment, even in a case where a document and a sheet of sizes which are not appropriately recognized by the document size sensors are set, printing may be performed in an appropriate reading range corresponding to the document size.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a detecting unit configured to detect a size of a document set on a document tray;
   a reading unit configured to read an image of the document;
   a specifying unit configured to specify a sheet on which to print the read image of the document; and
   an execution unit configured to execute a copy job to print the read image of the document on the specified sheet,
   wherein, in a case where the detected size of the document is a predetermined size and a size of the specified sheet is a size that is to be correctly detected by the detecting unit when the sheet is set on the document tray, the size of the document is determined to be the detected size of the document and the execution unit executes the copy job based on the detected size of the document, and
   wherein, in a case where the detected size of the document is the predetermined size and a size of the specified sheet is a size that is not to be correctly detected by the detecting unit when the sheet is set on the document tray, the size of the document is determined to be a size of the specified sheet and the execution unit executes the copy job based on the size of the specified sheet.

2. The image processing apparatus according to claim 1, further comprising a setting unit configured to set a magnification that a printing unit is configured to use for magnifying the read image of the document and to print the magnified image,
   wherein, in a case where the detected size of the document is the predetermined size, the size of the specified sheet is the size that is not to be correctly detected by the detecting unit when the sheet is set on the document tray, and the magnification set by the setting unit is equal-magnification, the size of the document is determined to be the detected size of the document and the execution unit executes the copy job based on the detected size of the document, and
   wherein, in a case where the detected size of the document is the predetermined size, the size of the specified sheet is the size that is not to be correctly detected by the detecting unit when the sheet is set on the document tray, and the magnification set by the setting unit is not equal-magnification, the size of the document is determined to be the size of the specified sheet and the execution unit executes the copy job based on the size of the specified sheet.

3. The image processing apparatus according to claim 1,
   wherein, in a case where the size of the document is determined to be the detected size of the document and the execution unit is to execute the copy job based on the determined size of the document, the reading unit reads the image of the document based on the detected size of the document and the execution unit executes the copy job for printing the read image of the document on the specified sheet, and
   wherein, in a case where the size of the document is determined, to be a size of the specified sheet and the execution unit to execute the copy job based on the determined size of the document, the reading unit reads the image of the document based on the size of the specified sheet and the execution unit executes the copy job for printing the read image of the document on the specified sheet.

4. The image processing apparatus according to claim 1, wherein the predetermined size includes LGL.

5. The image processing apparatus according to claim 1, wherein the predetermined size includes LTR.

6. A method for controlling an image processing apparatus, the method comprising:
   detecting a size of a document set on a document tray;
   reading an image of the document;
   specifying a sheet on which to print the read image of the document; and
   executing a copy job to print the read image of the document on the specified sheet,
   wherein, in a case where the detected size of the document is a predetermined size and a size of the specified sheet is a size that is to be correctly detected when the sheet is set on the document tray, the size of the document is determined to be the detected size of the document and executing includes executing the copy job based on the detected size of the document, and
   wherein, in a case where the detected size of the document is the predetermined size and a size of the specified sheet is a size that is not to be correctly detected when the sheet is set on the document tray, the size of the document is determined to be a size of the specified sheet and executing includes executing the copy job based on the size of the specified sheet.

7. The method according to claim 6, further comprising setting a magnification that a printing unit is configured to use for magnifying the read image of the document and to print the magnified image,
   wherein, in a case where the detected size of the document is the predetermined size, the size of the specified sheet is the size that is not to be correctly detected when the sheet is set on the document tray, and the magnification set is equal-magnification, the size of the document is determined to be the detected size of the document and executing includes executing the copy job based on the detected size of the document, and
   wherein, in a case where the detected size of the document is the predetermined size, the size of the specified sheet is the size that is not to be correctly detected when the sheet is set on the document tray, and the magnification set is not equal-magnification, the size of the document is determined to be the size of the specified sheet and executing includes executing the copy job based on the size of the specified sheet.

8. The method according to claim 6,
wherein, in a case where the size of the document is determined to be the detected size of the document and executing is to include executing the copy job based on the determined size of the document, reading includes reading the image of the document based on the detected size of the document and executing includes executing the copy job for printing the read image of the document on the specified sheet, and
wherein, in a case where the size of the document is determined to be a size of the specified sheet and executing is to include executing the copy job based on the determined size of the document, reading includes reading the image of the document based on the size of the specified sheet and executing includes executing the copy job for printing the read image of the document on the specified sheet.

9. The method according to claim 6, wherein the predetermined size includes LGL.

10. The method according to claim 6, wherein the predetermined size includes LTR.

11. A non-transitory computer-readable storage medium storing a program to cause a computer to perform a method for controlling an image processing apparatus, the method comprising:
detecting a size of a document set on a document tray;
reading an image of the document;
specifying a sheet on which to print the read image of the document; and
executing a copy job to print the read image of the document on the specified sheet,
wherein, in a case where the detected size of the document is a predetermined size and a size of the specified sheet is a size that is to be correctly detected when the sheet is set on the document tray, the size of the document is determined to be the detected size of the document and executing includes executing the copy job based on the detected size of the document, and
wherein, in a case where the detected size of the document is the predetermined size and a size of the specified sheet is a size that is not to be correctly detected when the sheet is set on the document tray, the size of the document is determined to be a size of the specified sheet and executing includes executing the copy job based on the size of the specified sheet.

12. The non-transitory computer-readable storage medium according to claim 11, further comprising setting a magnification that a printing unit is configured to use for magnifying the read image of the document and to print the magnified image,
wherein, in a case where the detected size of the document is the predetermined size, the size of the specified sheet is the size that is not to be correctly detected when the sheet is set on the document tray, and the magnification set is equal-magnification, the size of the document is determined to be the detected size of the document and executing includes executing the copy job based on the detected size of the document, and
wherein, in a case where the detected size of the document is the predetermined size, the size of the specified sheet is the size that is not to be correctly detected when the sheet is set on the document tray, and the magnification set is not equal-magnification, the size of the document is determined to be the size of the specified sheet and executing includes executing the copy job based on the size of the specified sheet.

13. The non-transitory computer-readable storage medium according to claim 11,
wherein, in a case where the size of the document is determined to be the detected size of the document and executing is to include executing the copy job based on the determined size of the document, reading includes reading the image of the document based on the detected size of the document and executing includes executing the copy job for printing the read image of the document on the specified sheet, and
wherein, in a case where the size of the document is determined to be a size of the specified sheet and executing is to include executing the copy job based on the determined size of the document, reading includes reading the image of the document based on the size of the specified sheet and executing includes executing the copy job for printing the read image of the document on the specified sheet.

14. The non-transitory computer-readable storage medium according to claim 11, wherein the predetermined size includes LGL.

15. The non-transitory computer-readable storage medium according to claim 11, wherein the predetermined size includes LTR.

* * * * *